US012728757B2

(12) United States Patent
Sakata et al.

(10) Patent No.: US 12,728,757 B2
(45) Date of Patent: Sep. 8, 2026

(54) CHARGING MANAGEMENT METHOD, RECORDING MEDIUM, AND CHARGING MANAGEMENT SYSTEM

(71) Applicant: Panasonic Intellectual Property Corporation of America, Torrance, CA (US)

(72) Inventors: Kotaro Sakata, Osaka (JP); Tetsuji Fuchikami, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 75 days.

(21) Appl. No.: 18/367,696

(22) Filed: Sep. 13, 2023

(65) Prior Publication Data

US 2023/0415604 A1 Dec. 28, 2023

Related U.S. Application Data

(63) Continuation of application No. PCT/JP2022/003390, filed on Jan. 28, 2022.

(30) Foreign Application Priority Data

Mar. 30, 2021 (JP) ................................ 2021-056969

(51) Int. Cl.
*B60L 53/66* (2019.01)
*B60L 53/65* (2019.01)
(Continued)

(52) U.S. Cl.
CPC ............ *B60L 53/665* (2019.02); *B60L 53/65* (2019.02); *G01C 21/3679* (2013.01); *G06Q 50/06* (2013.01)

(58) Field of Classification Search
CPC ........ B60L 53/665; B60L 53/65; B60L 53/63; B60L 2240/622; B60L 2250/12;
(Continued)

(56) References Cited

U.S. PATENT DOCUMENTS

2009/0313098 A1 12/2009 Hafner et al.
2012/0259723 A1 10/2012 Ansari et al.
(Continued)

FOREIGN PATENT DOCUMENTS

CN 112134300 A 12/2020
JP 2006-331405 12/2006
(Continued)

OTHER PUBLICATIONS

International Search Report issued May 10, 2022 in International (PCT) Application No. PCT/JP2022/003390.
(Continued)

*Primary Examiner* — Scott A Browne
(74) *Attorney, Agent, or Firm* — Wenderoth, Lind & Ponack, L.L.P.

(57) ABSTRACT

A charging management method includes first obtaining, second obtaining, generating, and presenting. In the first obtaining, location information on the location of an electrified vehicle and battery information are obtained. In the second obtaining, desired-power-source information on a user's desired charging power source is obtained. In the generating, charging information on charging of the storage battery is generated on the basis of the battery information and the desired-power-source information. In the presenting, the charging information and location information on the location of a recommended charging facility are presented to the user, the recommend charging facility being a charging facility recommendable for the user on the basis of the
(Continued)

location information on the location of the electrified vehicle, among charging facilities.

9 Claims, 7 Drawing Sheets

(51) Int. Cl.
*G01C 21/36* (2006.01)
*G06Q 50/06* (2012.01)

(58) Field of Classification Search
CPC .... B60L 2250/16; B60L 53/305; B60L 53/64; B60L 53/67; B60L 53/68; G01C 21/3679; G01C 21/3469; G01C 21/3697; G06Q 50/06; G06Q 30/02; G06Q 50/10; Y02T 10/70; Y02T 10/7072; Y02T 90/12; Y02T 90/16
See application file for complete search history.

(56) References Cited

U.S. PATENT DOCUMENTS

2013/0127416 A1* 5/2013 Karner .................. G06Q 50/40 320/109
2013/0339072 A1* 12/2013 Touge .................... B60L 53/66 705/5
2014/0361745 A1 12/2014 NIshita et al.
2016/0214491 A1* 7/2016 Yoko ...................... B60L 53/20
2021/0291693 A1* 9/2021 Ferguson ............. H02J 7/0016

FOREIGN PATENT DOCUMENTS

| | | |
|---|---|---|
| JP | 2011-107929 | 6/2011 |
| JP | 2011-174711 | 9/2011 |
| JP | 2012-221496 | 11/2012 |
| JP | 2013-25432 | 2/2013 |
| JP | 6085544 | 2/2017 |
| JP | 2019-33629 | 2/2019 |
| JP | 2020-170244 A | 10/2020 |
| WO | 2012/081520 | 6/2012 |
| WO | 2012/108004 | 8/2012 |
| WO | 2013/099549 | 7/2013 |
| WO | 2018/225125 | 12/2018 |

OTHER PUBLICATIONS

Office Action with Search Report mailed on Apr. 7, 2026 for corresponding Chinese patent application No. 202280023646.4, with English translation of Search Report, 10 pages.

* cited by examiner

FIG. 4

5
51
M2
Input proportions of electricity used in charging session
TB1
Renewables %
TB2
Non-renewable sources %
(Total) 100%

FIG. 5

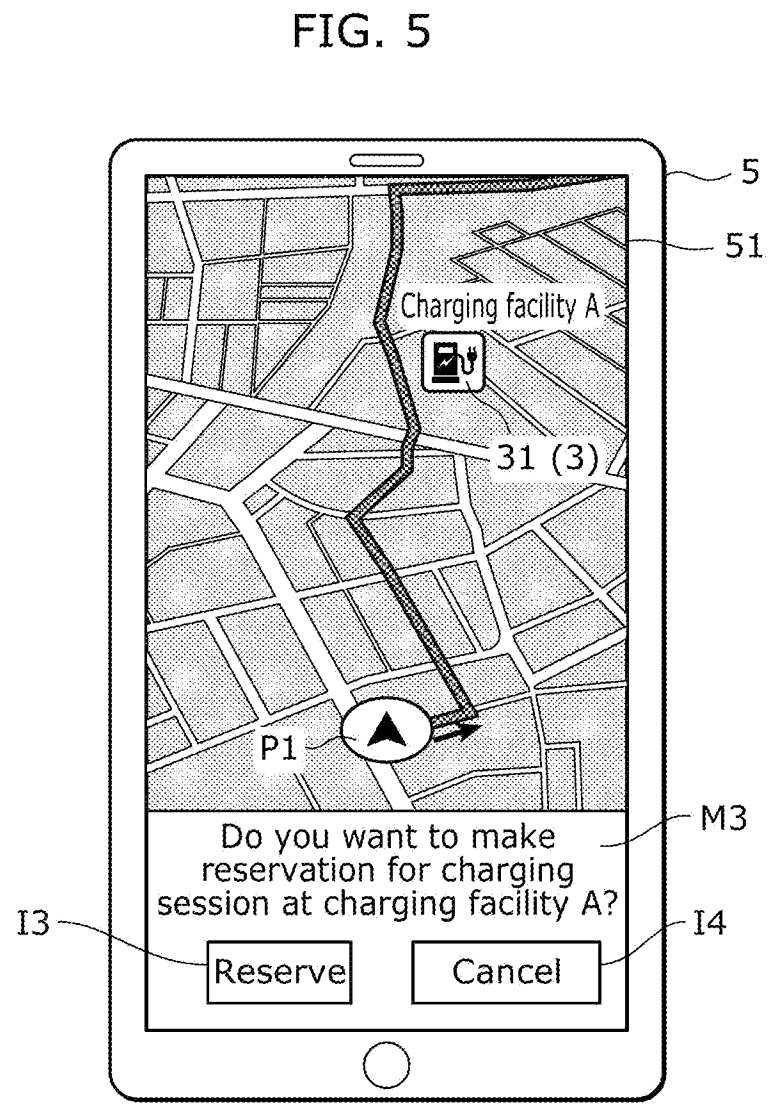

5
51
Charging facility A
31 (3)
P1
M3
Do you want to make reservation for charging session at charging facility A?
Reserve
Cancel
I3
I4

Charging facility A 31 (3)

P1

Reservation for charging session at charging facility A has been made.

M4

CHARGING MANAGEMENT METHOD, RECORDING MEDIUM, AND CHARGING MANAGEMENT SYSTEM

CROSS REFERENCE TO RELATED APPLICATIONS

This is a continuation application of PCT International Application No. PCT/JP2022/003390 filed on Jan. 28, 2022, designating the United States of America, which is based on and claims priority of Japanese Patent Application No. 2021-056969 filed on Mar. 30, 2021. The entire disclosures of the above-identified applications, including the specifications, drawings and claims are incorporated herein by reference in their entirety.

FIELD

The present disclosure relates to a charging management method, a recording medium, and a charging management system which are designed to manage charging of a storage battery mounted on an electrified vehicle.

BACKGROUND

Japanese Patent No. 6085544 relates to a quick-charging facility for electric vehicles and a charging facility system, the quick-charging facility being connected to a power generator, such as a solar power generation module, or a charge-discharge device, such as a stationary storage battery. Japanese Patent No. 6085544 discloses an energy management method for each device connected to the charging facility.

Japanese Unexamined Patent Application Publication No. 2012-221496 discloses a method of distributing charge capacity to electric vehicles in a charging system that includes a solar charge capacity generated locally.

CITATION LIST

Patent Literature

PTL 1: Japanese Patent No. 6085544

PTL 2: Japanese Unexamined Patent Application Publication No. 2012-221496

SUMMARY

Technical Problem

The present disclosure aims to provide a charging management method, a recording medium, and a charging management system which facilitate charging a storage battery mounted on an electrified vehicle by using a user's desired charging power source.

Solution to Problem

A charging management method according to one aspect of the present disclosure includes first obtaining, second obtaining, generating, and presenting. In the first obtaining, location information on the location of an electrified vehicle and battery information on the remaining capacity of a storage battery mounted on the electrified vehicle are obtained. In the second obtaining, desired-power-source information on the charging power source with which a user of the electrified vehicle wants to charge the storage battery is obtained. In the generating, charging information on charging of the storage battery is generated based on the battery information obtained in the first obtaining and the desired-power-source information obtained in the second obtaining. In the presenting, the charging information generated in the generating and location information on the location of a recommended charging facility are presented to the user, the recommended charging facility being a charging facility recommendable for the user based on the location information on the location of the electrified vehicle obtained in the first obtaining, among charging facilities.

A recording medium according to another aspect of the present disclosure is a non-transitory computer-readable recording medium having recorded thereon a program for causing at least one processor to perform the charging management method.

A charging management system according to still another aspect of the present disclosure includes a first obtainer, a second obtainer, a charging information generator, and a presentation unit. The first obtainer obtains location information on the location of an electrified vehicle and battery information on the remaining capacity of a storage battery mounted on the electrified vehicle. The second obtainer obtains desired-power-source information on the charging power source with which a user of the electrified vehicle wants to charge the storage battery. The charging information generator generates charging information on charging of the storage battery, based on the battery information obtained by the first obtainer and the desired-power-source information obtained by the second obtainer. The presentation unit presents, to the user, the charging information generated by the charging information generator and location information on the location of a recommended charging facility, the recommended charging facility being a charging facility recommendable for the user based on the location information on the location of the electrified vehicle obtained by the first obtainer, among charging facilities.

Advantageous Effects

As an advantage, the present disclosure facilitates charging a storage battery mounted on an electrified vehicle by using a user's desired charging power source.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 illustrates another example of the screen for the user to select a desired charging power source, the screen being the screen of the information terminal according to the embodiment.

FIG. 5 illustrates an example of the screen of the information terminal according to the embodiment presented to the user.

FIG. 6 illustrates an example of the screen displaying the completion of reservation at a recommended charging facility, the screen being the screen of the information terminal according to the embodiment.

DESCRIPTION OF EMBODIMENT

Figure 1:
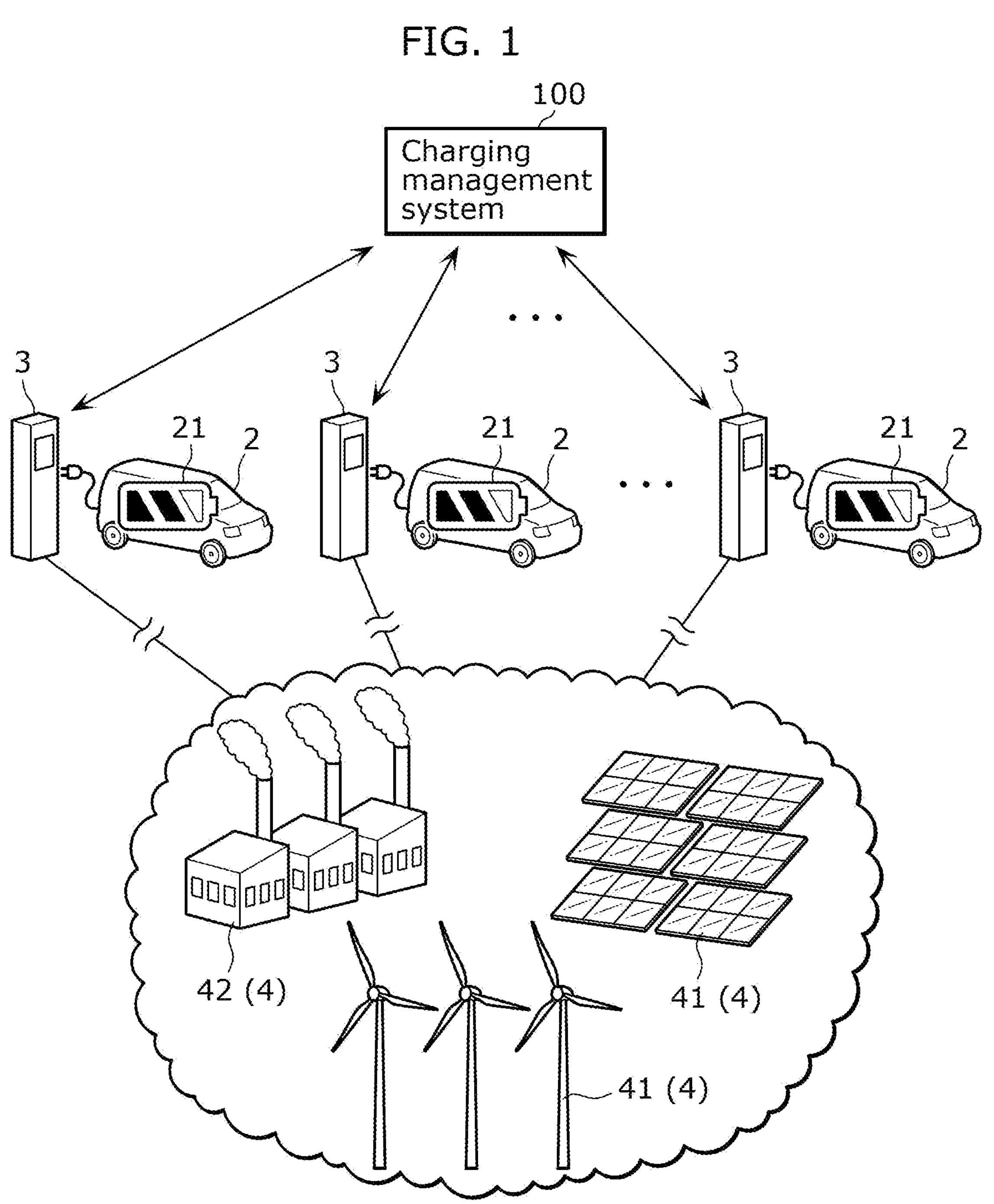
FIG. 1 illustrates an overview of a charging management system according to an embodiment.

A charging management method according to one aspect of the present disclosure includes first obtaining, second obtaining, generating, and presenting. In the first obtaining, location information on the location of an electrified vehicle and battery information on the remaining capacity of a storage battery mounted on the electrified vehicle are obtained. In the second obtaining, desired-power-source information on the charging power source with which a user of the electrified vehicle wants to charge the storage battery is obtained. In the generating, charging information on charging of the storage battery is generated based on the battery information obtained in the first obtaining and the desired-power-source information obtained in the second obtaining. In the presenting, the charging information generated in the generating and location information on the location of a recommended charging facility are presented to the user, the recommended charging facility being a charging facility recommendable for the user based on the location information on the location of the electrified vehicle obtained in the first obtaining, among charging facilities.

Thus, it is possible to present, to the user, recommended charging facility 31 at which storage battery 21 can be charged using user's desired charging power source 4. This facilitates charging storage battery 21 mounted on electrified vehicle 2 by using user's desired charging power source 4. That is, it is possible to meet user's various needs, such as a need to charge storage battery 21 by using charging power source 4 having composition in which emphasis is placed on the cost and a need to charge storage battery 21 by using charging power source 4 having composition in which emphasis is placed on the environmental friendliness.

For instance, the charging power source may include a first power source derived from renewable energy and a second power source derived from non-renewable energy.

It is possible to meet both user's needs, a need to use electricity derived from renewable energy from an environmental perspective and a need to use electricity derived from non-renewable energy from a cost perspective.

For instance, the charging management method may further include predicting and securing. In the predicting, a charging demand at each of the charging facilities is predicted based on the battery information obtained in the first obtaining and the desired-power-source information obtained in the second obtaining. In the securing, the charging power source is secured for each of the charging facilities, based on the charging demand predicted in the predicting.

This makes it easier to avoid a shortage of user's desired charging power source 4 at each charging facility 3.

For instance, the charging management method may further include third obtaining. In the third obtaining, reservation information as to whether a reservation for a charging session at the recommended charging facility presented in the presenting has been made is obtained. In the predicting, the charging demand is predicted based further on the reservation information obtained in the third obtaining.

By referring to almost determined future charging demand expected at recommended charging facility 31 rather than predicted charging demand, improvement in the accuracy of prediction of the charging demand can be expected.

For instance, the presenting may include further presenting the cost of charging the storage battery.

Since the user can know the cost of charging storage battery 21, the user can more easily choose on which of the environmental friendliness and the cost they want to place emphasis when charging storage battery 21. Accordingly, improvement in the user convenience can be expected.

For instance, the first obtaining may include further obtaining route information on the scheduled driving route of the electrified vehicle. In the presenting, the location information on the location of the recommended charging facility may be presented based further on the route information obtained in the first obtaining.

Thus, the user does not have to go to charging facility 3 located off the scheduled driving route. Accordingly, the user convenience improves.

Furthermore, a recording medium according to another aspect of the present disclosure is a non-transitory computer-readable recording medium having recorded thereon a program for causing at least one processor to perform the charging management method.

Thus, it is possible to present, to the user, recommended charging facility 31 at which storage battery 21 can be charged using user's desired charging power source 4. This facilitates charging storage battery 21 mounted on electrified vehicle 2 by using user's desired charging power source 4. That is, it is possible to meet user's various needs, such as a need to charge storage battery 21 by using charging power source 4 having composition in which emphasis is placed on the cost and a need to charge storage battery 21 by using charging power source 4 having composition in which emphasis is placed on the environmental friendliness.

Furthermore, a charging management system according to still another aspect of the present disclosure includes a first obtainer, a second obtainer, a charging information generator, and a presentation unit. The first obtainer obtains location information on the location of an electrified vehicle and battery information on the remaining capacity of a storage battery mounted on the electrified vehicle. The second obtainer obtains desired-power-source information on the charging power source with which a user of the electrified vehicle wants to charge the storage battery. The charging information generator generates charging information on charging of the storage battery, based on the battery information obtained by the first obtainer and the desired-power-source information obtained by the second obtainer. The presentation unit presents, to the user, the charging information generated by the charging information generator and location information on the location of a recommended charging facility, the recommended charging facility being a charging facility recommendable for the user based on the location information on the location of the electrified vehicle obtained by the first obtainer, among charging facilities.

Thus, it is possible to present, to the user, recommended charging facility 31 at which storage battery 21 can be charged using user's desired charging power source 4. This facilitates charging storage battery 21 mounted on electrified vehicle 2 by using user's desired charging power source 4. That is, it is possible to meet user's various needs, such as a need to charge storage battery 21 by using charging power source 4 having composition in which emphasis is placed on the cost and a need to charge storage battery 21 by using charging power source 4 having composition in which emphasis is placed on the environmental friendliness.

It should be noted that these general or specific aspects may be embodied as a system, a method, an integrated circuit, a computer program, or a recording medium such as a computer-readable CD-ROM or may be embodied by optionally combining the system, the method, the integrated circuit, the computer program, and the recording medium.

An embodiment is specifically described below with reference to the drawings. It should be noted that the embodiment described below shows specific examples of the present disclosure. The numerical values, shapes, materials, structural elements, positions and connections of the structural elements, steps, order of the steps, and other descriptions provided in the embodiment below are mere examples and are not intended to limit the present disclosure. In addition, the structural elements not included in the independent claims representing superordinate concepts, among the structural elements in the embodiment below are described as optional structural elements.

EMBODIMENT

1. Overview

An overview of a charging management system according to an embodiment is described. FIG. 1 illustrates an overview of charging management system 100 according to the embodiment. As illustrated in FIG. 1, charging management system 100 is designed to manage charging of storage battery 21 mounted on electrified vehicle 2. Storage battery 21 of electrified vehicle 2 is charged by supplying power from charging power source 4 to storage battery 21 via charging facility (charging point) 3.

Electrified vehicle 2 travels by using electricity stored in storage battery 21 as an energy source and an electric motor as a power source. Electrified vehicle 2 may include energy sources including electricity. For instance, electrified vehicle 2 may be a gasoline-electric hybrid vehicle. In this case, electrified vehicle 2 uses both electricity and gasoline as energy sources. When using electricity as an energy source, electrified vehicle 2 travels by using an electric motor as a power source. When using gasoline as an energy source, electrified vehicle 2 travels by using an internal-combustion engine as a power source. In the embodiment, electrified vehicle 2 is an electric vehicle. It should be noted that examples of electrified vehicle 2 may include a motorcycle or a bicycle in addition to an automobile.

In the embodiment, charging management system 100 manages electrified vehicle 2 belonging to or temporarily rented by the user who made a use contract with the operator of charging management system 100. Charging management system 100 manages electrified vehicles 2. For instance, charging management system 100 manages tens of thousands of electrified vehicles 2.

Charging power source 4 is connected to charging facility 3 via a power transmission facility and/or a power transformation facility and supplies power to storage battery 21 mounted on electrified vehicle 2 via charging facility 3. In the embodiment, charging power sources 4 include power sources having different power generation methods. As an example, charging power sources 4 include first power source 41 derived from renewable energy and second power source 42 derived from non-renewable energy (hereinafter referred to as fossil fuel energy and other energy sources).

First power sources 41 may include, for example, a power source that supplies power generated by, for example, solar power generation and a power source that supplies power generated by hydraulic power generation, wind power generation, geothermal power generation, or biomass power generation. That is, first power source 41 is a power source which can be suitable for a carbon neutral society where fossil fuels, such as coal oil or coal, are no longer used so as not to emit greenhouse gases, such as carbon dioxide, which are a cause of global warming. As examples of first power sources 41, FIG. 1 illustrates a power source that supplies power generated by solar power generation and a power source that supplies power generated by wind power generation.

Second power sources 42 may include a power source that supplies power generated by, for example, thermal power generation or nuclear power generation. It should be noted that the power source that supplies power generated by nuclear power generation can be suitable for the carbon neutral society. However, the power source that supplies power generated by nuclear power generation is not derived from renewable energy and thus is included in second power source 42. As an example of second power source 42, FIG. 1 illustrates a power source that supplies power generated by thermal power generation.

Charging facilities 3 are installed in an area (e.g., throughout a country) in which the operator of charging management system 100 provides services. Charging facilities 3 are installed by the operator or another company which partners with the operator. In the embodiment, (e.g., thousands of) charging facilities 3 are dispersedly located in the area. It should be noted that just one charging facility 3 may be installed for each installation location, or several charging facilities 3 or more than 10 and less than 20 charging facilities 3 may be installed for each installation location.

In addition to standard chargers, charging facilities 3 may include, for example, quick chargers having greater output than the standard chargers. It should be noted that in addition to untethered chargers (socket-only chargers), charging facilities 3 may include tethered chargers (cable-attached chargers).

When charging facility 3 is an untethered charger, storage battery 21 of electrified vehicle 2 can be charged in the following manner: a plug provided at one end of a charging cable in electrified vehicle 2 is plugged in, and a charging connector provided at the other end of the charging cable is connected to the charging inlet of electrified vehicle 2. When charging facility 3 is a tethered charger, storage battery 21 of electrified vehicle 2 can be charged by connecting a charging connector provided at one end of a charging cable to the charging inlet of electrified vehicle 2.

In addition, charging facility 3 may be a wireless power transfer charger. When charging facility 3 is a wireless power transfer charger, storage battery 21 of electrified vehicle 2 can be charged by contactlessly supplying power from a transmitter coil embedded in a road surface to a receiver coil mounted on electrified vehicle 2 by using an electromagnetic induction technology.

2. Configuration

Charging management system 100 is described below in detail. Charging management system 100 is, for example, a server device. Unless otherwise stated, one electrified vehicle 2 or one user is focused on in the descriptions below. In practice, charging management system 100 performs the processing described below for each electrified vehicle 2 or each user.

Figure 2:
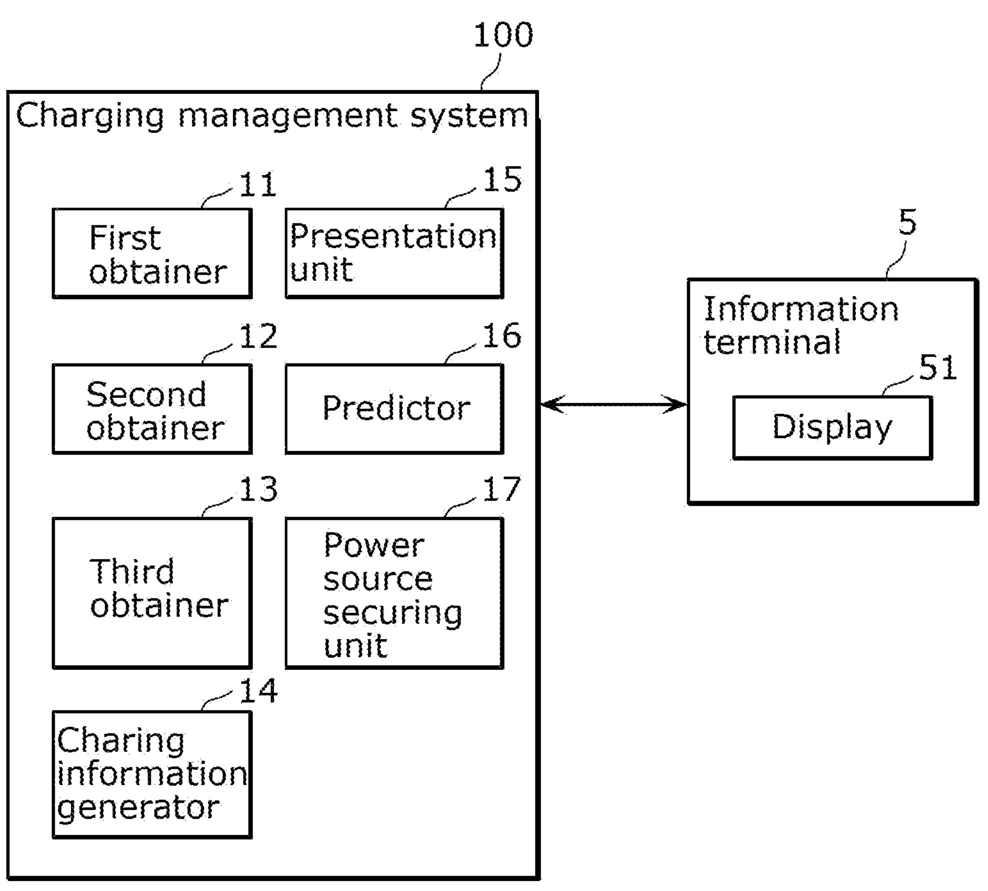
FIG. 2 is a block diagram illustrating a configuration of the charging management system according to the embodiment.

FIG. 2 is a block diagram illustrating a configuration of charging management system 100 according to the embodiment. As illustrated in FIG. 2, charging management system 100 includes first obtainer 11, second obtainer 12, third obtainer 13, charging information generator 14, presentation unit 15, and predictor 16, and power source securing unit 17.

First obtainer 11 obtains location information on the location of electrified vehicle 2 and battery information on the remaining capacity of storage battery 21 mounted on electrified vehicle 2. First obtainer 11 performs first obtainment step ST1 (see FIG. 7) in a charging management method. The location information on the location of electrified vehicle 2 includes, for example, the coordinates of the present location of electrified vehicle 2 measured by a positioning system such as a global position system (GPS). The battery information may include, for example, the current remaining capacity of storage battery 21 or the chargeable capacity of storage battery 21 obtained by subtracting the current remaining capacity from the full capacity of storage battery 21. The battery information may also include state of charge (SoC).

First obtainer 11 periodically obtains the location information on the location of electrified vehicle 2 and the battery information from a server operated by the manufacturer of electrified vehicle 2, by, for example, making a request to the server via a communication network such as the Internet. This is because the manufacturer manages the state of electrified vehicle 2 by periodically obtaining, from electrified vehicle 2, the location information and the battery information. It should be noted that first obtainer 11 may directly obtain the location information and the battery information by communicating with electrified vehicle 2 via a communication network.

Second obtainer 12 obtains desired-power-source information on charging power source 4 with which the user of electrified vehicle 2 wants to charge storage battery 21. Second obtainer 12 performs second obtainment step ST2 (see FIG. 7) in the charging management method. The desired-power-source information may include, for example, information indicating that the user wants to charge storage battery 21 by using one of first power source 41 and second power source 42. Moreover, in a case in which for example the user wants to charge storage battery 21 by using both first power source 41 and second power source 42, the desired-power-source information may include information regarding the proportions of use of first power source 41 and second power source 42.

Second obtainer 12 obtains the desired-power-source information input by using information terminal 5 of the user, by communicating with information terminal 5 via a communication network. Information terminal 5 may be, for example, a portable terminal such as a smartphone or a tablet terminal. Information terminal 5 may also be a stationary terminal such as a desktop or laptop personal computer.

In the embodiment, a dedicated application for using charging management system 100 is installed onto information terminal 5. By operating information terminal 5 and starting the application, the user can select desired charging power source 4.

Figure 3:
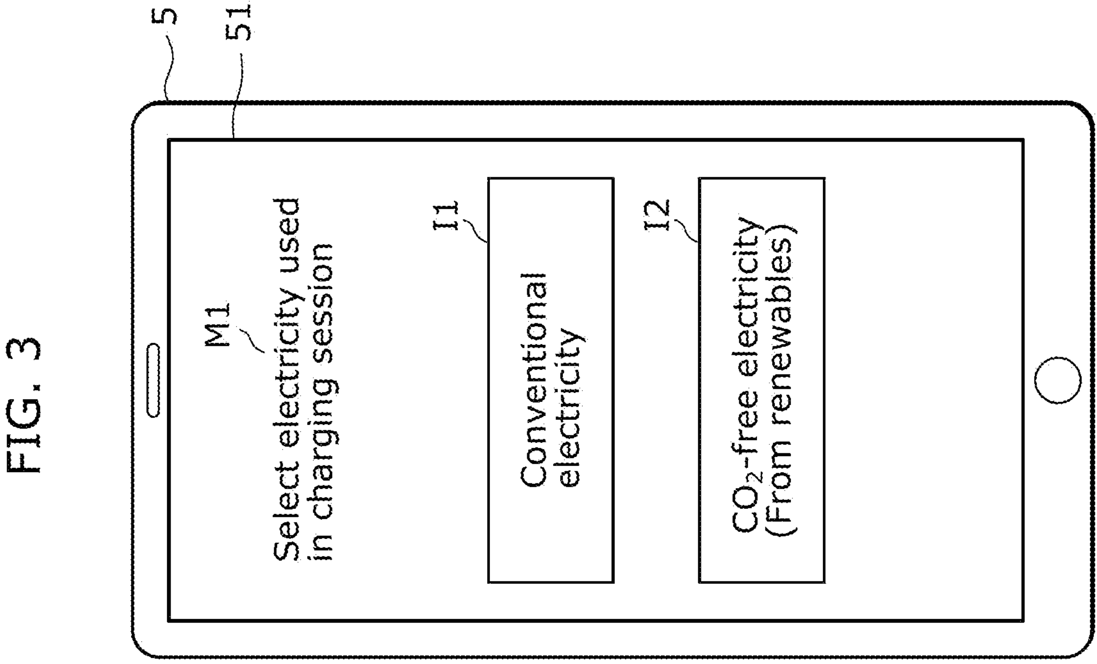
FIG. 3 illustrates an example of a screen for a user to select a desired charging power source, the screen being the screen of an information terminal according to the embodiment.

Specifically, when the user operates information terminal 5 and starts the application, for instance, a screen as illustrated in FIG. 3 appears on display 51 of information terminal 5. FIG. 3 illustrates an example of a screen for the user to select desired charging power source 4, the screen being the screen of information terminal 5 according to the embodiment. In the example illustrated in FIG. 3, display 51 is displaying message M1, first icon I1, and second icon 12. Message M1 indicates that "Select electricity used in charging session." First icon I1 includes the character string of "Conventional electricity." Second icon 12 includes the character string of $CO_2$-free electricity (From renewables)."

When the user selects first icon I1 by, for example, user's finger touch on display 51, information terminal 5 generates desired-power-source information indicating that second power source 42 is desired charging power source 4. Then, information terminal 5 transmits a signal including the generated desired-power-source information to charging management system 100 via the communication network. When the user selects second icon 12 by, for example, user's finger touch on display 51, information terminal 5 generates desired-power-source information indicating that first power source 41 is desired charging power source 4. Then, information terminal 5 transmits a signal including the generated desired-power-source information to charging management system 100 via the communication network. By receiving these signals, second obtainer 12 obtains the desired-power-source information.

Figure 4:
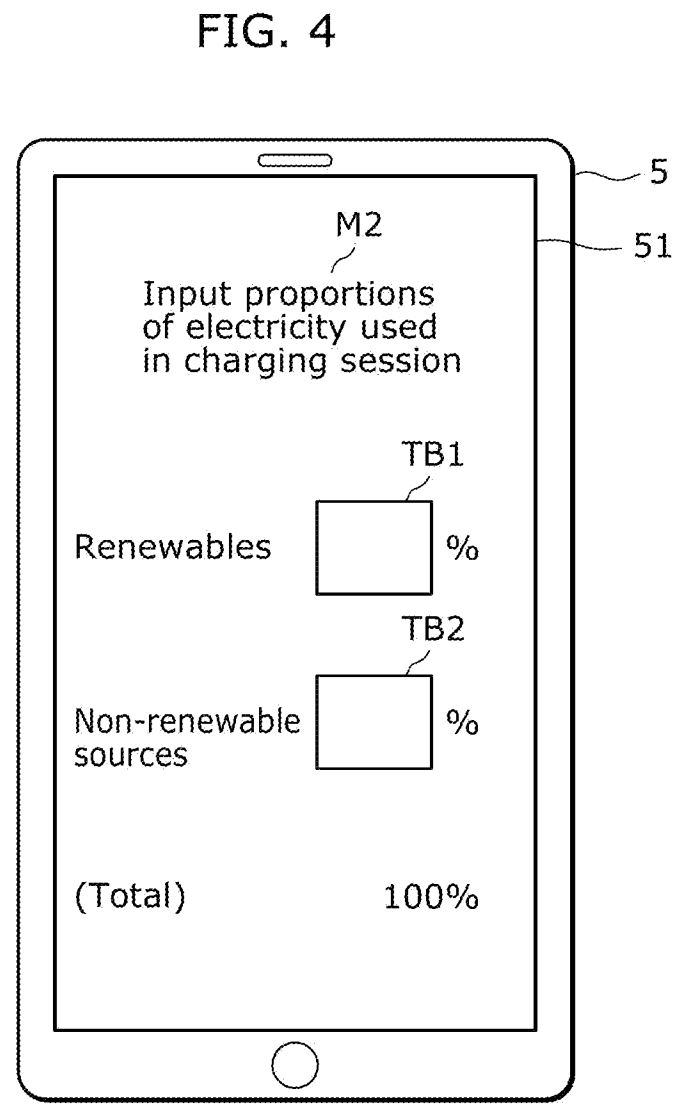

When the user operates information terminal 5 and starts the application, for instance, a screen as illustrated in FIG. 4 may appear on display 51 of information terminal 5. FIG. 4 illustrates another example of the screen for the user to select desired charging power source 4, the screen being the screen of information terminal 5 according to the embodiment. In the example illustrated in FIG. 4, display 51 is displaying message M2, first text box TB1, and second text box TB2. Message M2 indicates that "Input proportions of electricity used in charging session." First text box TB1 is a box for inputting the proportion of use of electricity derived from "renewables" (i.e., renewable energy). Second text box TB2 is a box for inputting the proportion of use of electricity derived from "non-renewable sources" (i.e., fossil fuel energy and other energy sources). Display 51 is also displaying the total of the proportions of use of the electricity derived from "renewables" and the electricity derived from "non-renewable sources."

When the user inputs a number to each of first text box TB1 and second text box TB2 by, for example, user's finger touch on display 51, information terminal 5 generates desired-power-source information including the proportion of use of first power source 41 as charging power source 4 and the proportion of use of second power source 42 as charging power source 4. Then, information terminal 5 transmits a signal including the generated desired-power-source information to charging management system 100 via the communication network. By receiving the signal, second obtainer 12 obtains the desired-power-source information.

It should be noted that the user can perform, on the application, settings as to which one of the screen illustrated in FIG. 3 and the screen illustrated in FIG. 4 is displayed on display 51 of information terminal 5 when the user starts the application.

In addition, although not illustrated in FIG. 3 or FIG. 4, display 51 may display a text box for the user to input a time period during which storage battery 21 is charged. In this case, the desired-power-source information includes the time period during which storage battery 21 is charged by the user.

Although not illustrated in FIG. 3 or FIG. 4, display 51 may display the unit price of charging storage battery 21 (that is, the cost of charging per kWh). For instance, in the example illustrated in FIG. 3, display 51 may display the unit price of charging storage battery 21 when first icon I1 is selected and the unit price of charging storage battery 21 when second icon 12 is selected. For instance, in the example illustrated in FIG. 4, the screen may display the unit price of charging storage battery 21 according to the proportion of use input to each of first text box TB1 and second text box TB2.

When presentation unit 15 (presentation step ST5), which is described later, transmits, to information terminal 5, a signal including the unit price of charging storage battery 21, the unit price is displayed on display 51. That is, presentation unit 15 (presentation step ST5) further presents the cost of charging storage battery 21. It should be noted that the unit price of charging storage battery 21 may be presented when display 51 displays the screen illustrated in FIG. 3 or 4, as described above or when presentation unit 15 (presentation step ST5) presents, for example, the location information on the location of recommended charging facility 31 (see FIG. 5), as described later.

Charging information generator 14 generates charging information on charging on storage battery 21 on the basis of the battery information obtained by first obtainer 11 (first obtainment step ST1) and the desired-power-source information obtained by second obtainer 12 (second obtainment step ST2). Charging information generator 14 performs charging information generation step ST4 in the charging management method. The charging information may include information indicating the type of charging power source 4 included in the desired-power-source information and the amount of charging energy necessary to fully charge storage battery 21, calculated on the basis of the battery information. When the desired-power-source information includes the proportions of use of respective power sources, the charging information may include information indicating, for each power source, the amount of charging energy necessary to fully charge storage battery 21. The charging information may include information indicating the cost of fully charging storage battery 21, that is, the cost of charging storage battery 21. The cost may be the unit price of charging or the total cost of charging storage battery 21.

Presentation unit 15 presents, to the user, the location information on the location of recommended charging facility 31 and the charging information generated by charging information generator 14 (charging information generation step ST4). Presentation unit 15 performs presentation step ST5 in the charging management method. Recommended charging facility 31 is charging facility 3 recommendable for the user on the basis of the location information on the location of electrified vehicle 2 obtained by first obtainer 11 (first obtainment step ST1), among charging facilities 3.

Specifically, recommended charging facility 31 is charging facility 3 at which storage battery 21 can be charged using user's desired charging power source 4 and is nearest charging facility 3 from, for example, the present location of the user (that is, the present location of electrified vehicle 2). When for example the user specifies the time period during which storage battery 21 is charged, recommended charging facility 31 is nearest charging facility 3 from the estimated location of electrified vehicle 2 during the specified time period.

When the scheduled driving route of electrified vehicle 2 is preset by the user in, for example, a car navigation system, recommended charging facility 31 may be charging facility 3 located on or near the scheduled driving route. In this case, by, for example, communicating with electrified vehicle 2 via the communication network, first obtainer 11 (first obtainment step ST1) further obtains route information on the scheduled driving route of electrified vehicle 2. Presentation unit 15 (presentation step ST5) then presents the location information on the location of recommended charging facility 31 on the further basis of the route information obtained by first obtainer 11 (first obtainment step ST1).

In the embodiment, presentation unit 15 generates presentation information including the location information on the location of recommended charging facility 31 and the charging information. Then, presentation unit 15 transmits a signal including the generated presentation information to information terminal 5 via the communication network. When receiving the signal, information terminal 5 causes display 51 to display the presentation information included in the signal. That is, presentation unit 15 presents, to the user, the location information on the location of recommended charging facility 31 and the charging information, via information terminal 5.

FIG. 5 illustrates an example of the screen of information terminal 5 according to the embodiment presented to the user. In the example illustrated in FIG. 5, display 51 is displaying a map, the map including present location P1 of electrified vehicle 2, the installation location of charging facility A which is recommended charging facility 31, and the driving route from present location P1 of electrified vehicle 2 to charging facility A. Display 51 is displaying message M3 indicating that "Do you want to make reservation for charging session at charging facility A?", third icon 13 including the character string of "Reserve", and fourth icon 14 including the character string of "Cancel." Although not illustrated in FIG. 5, presentation unit 15 causes display 51 to display, for example, the type of charging power source 4 and/or a character string indicating charging information on, for example, the amount of charging energy necessary to fully charge storage battery 21. It should be noted that although not illustrated in FIG. 5, presentation unit 15 may further cause display 51 to display an estimated period necessary to reach charging facility A.

Third obtainer 13 obtains reservation information as to whether a reservation for a charging session at recommended charging facility 31 presented by presentation unit 15 (in presentation step ST5) has been made. Third obtainer 13 performs third obtainment step ST3 (see FIG. 7) in the charging management method. Third obtainer 13 obtains the reservation information input by the user on information terminal 5, by communicating with information terminal 5 via the communication network.

Specifically, in the state in which the screen illustrated in FIG. 5 is displayed on display 51 of information terminal 5, the user selects third icon 13 by, for example, finger touch on display 51. Then, information terminal 5 generates reservation information indicating that the user wants to make a reservation for a charging session at recommended charging facility 31 and transmits a signal including the generated reservation information to charging management system 100 via the communication network. By receiving the signal, third obtainer 13 obtains the reservation information.

Figure 6:
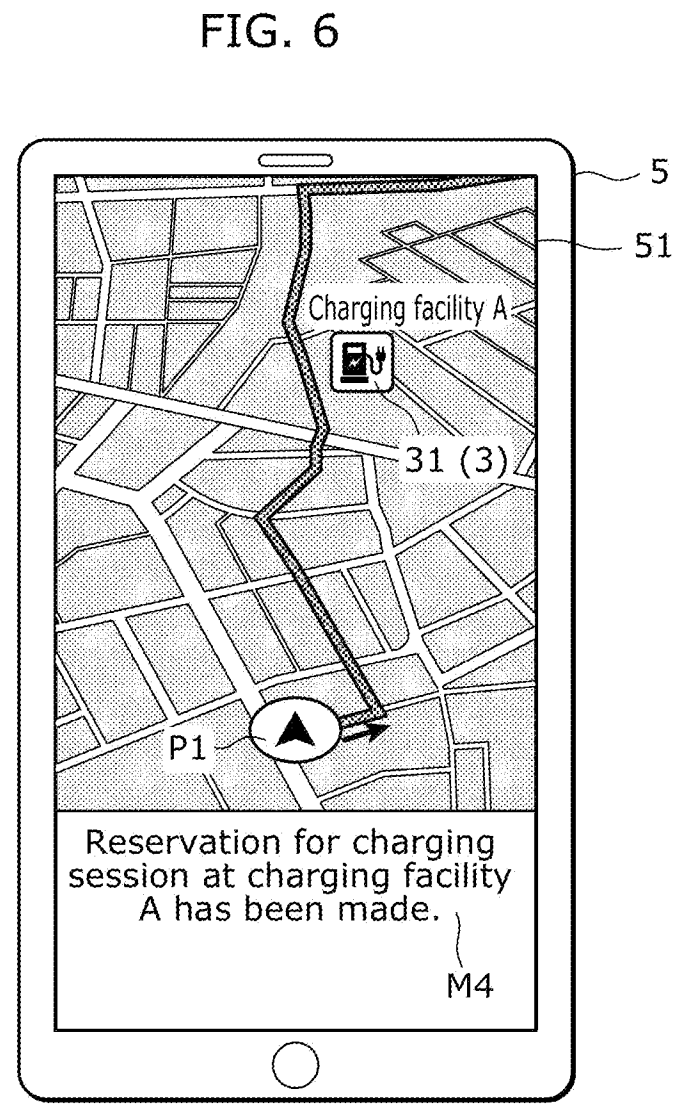

In this case, presentation unit 15 causes display 51 to display a screen as illustrated in FIG. 6. FIG. 6 illustrates an example of the screen displaying the completion of reservation at recommended charging facility 31, the screen being the screen of information terminal 5 according to the embodiment. In the example illustrated in FIG. 6, display 51 is displaying a map as with the example illustrated in FIG. 5 and message M4 that "Reservation for charging session at charging facility A has been made."

It should be noted that when the user selects fourth icon 14 by, for example, finger touch on display 51, a reservation for a charging session at recommended charging facility 31 is not made. In addition, a signal including reservation information is not transmitted to charging management system 100. In this case, information terminal 5 may transmit, to charging management system 100, a signal including, for example, a command requesting that recommended charging facility 31 be presented again. When receiving the signal, presentation unit 15 of charging management system 100 presents, to the user, recommended charging facility 31 different from previously presented recommended charging facility 31.

Predictor 16 predicts the charging demand at each of charging facilities 3 on the basis of the battery information obtained by first obtainer 11 (first obtainment step ST1) and the desired-power-source information obtained by second obtainer 12 (second obtainment step ST2). Predictor 16 performs prediction step ST6 in the charging management method. The charging demand is the amount of power expected to be consumed in the future at each charging facility 3 to charge storage batteries 21 and the amount of power for each of the types of charging power sources 4. The amount of power is predicted, for example, for each of separated time periods, such as the morning, or for each hour.

Predictor 16 calculates the amount of power estimated to be necessary in the future at each charging facility 3 on the basis of the battery information (the remaining capacity of storage battery 21) obtained from each electrified vehicle 2 and a past charging history at each charging facility 3. Predictor 16 calculates the proportions of use of charging power sources 4 estimated to be necessary in the future at each charging facility 3, on the basis of, for example, the desired-power-source information from the user of each electrified vehicle 2 and a history of the proportions of past use of charging power sources 4 at each charging facility 3. By comprehensively taking the calculation results into account, predictor 16 predicts the charging demand at each charging facility 3.

In the embodiment, predictor 16 (prediction step ST6) predicts the charging demand on the further basis of the reservation information obtained by third obtainer 13 (third obtainment step ST3). That is, by referring to the reservation information, predictor 16 can recognize the future charging demand at recommended charging facility 31. The charging demand is not predicted charging demand but almost determined future charging demand. Thus, by predictor 16 further referring to the reservation information, improvement in the accuracy of prediction of the charging demand can be expected.

Power source securing unit 17 secures one or more charging power sources 4 for each of charging facilities 3 on the basis of the charging demand predicted by predictor 16 (in prediction step ST6). Power source securing unit 17 performs power source securing step ST7 in the charging management method. Power source securing unit 17 secures one or more charging power sources 4 for each charging facility 3 to avoid a future shortage of power necessary to charge storage batteries 21 at charging facility 3.

Methods of securing charging power source 4 may include, for example, a method of securing charging power source 4 (e.g., a power plant) held by the operator of charging management system 100. The methods of securing charging power source 4 may include a method of securing charging power source 4 from a power provider holding charging power source 4, by having a power purchase agreement with the power provider. The methods of securing charging power source 4 may include a method of securing charging power source 4 purchased from an electric power wholesale market (e.g., Japan electric power exchange (JEPX) in Japan). Power source securing unit 17 secures one or more charging power sources 4 for each charging facility 3, by using at least one of the power source securing methods described above.

It should be noted that power source securing unit 17 may use different securing methods for the respective types of charging power sources 4. For instance, power source securing unit 17 may secure first power source 41 held by a first power provider and secure second power source 42 held by a second power provider different from the first power provider.

In addition, power source securing unit 17 may secure one or more charging power sources 4 so as to meet the entire charging demand of each charging facility 3 or so as to meet a power shortage at each charging facility 3.

3. Operation

Figure 7:
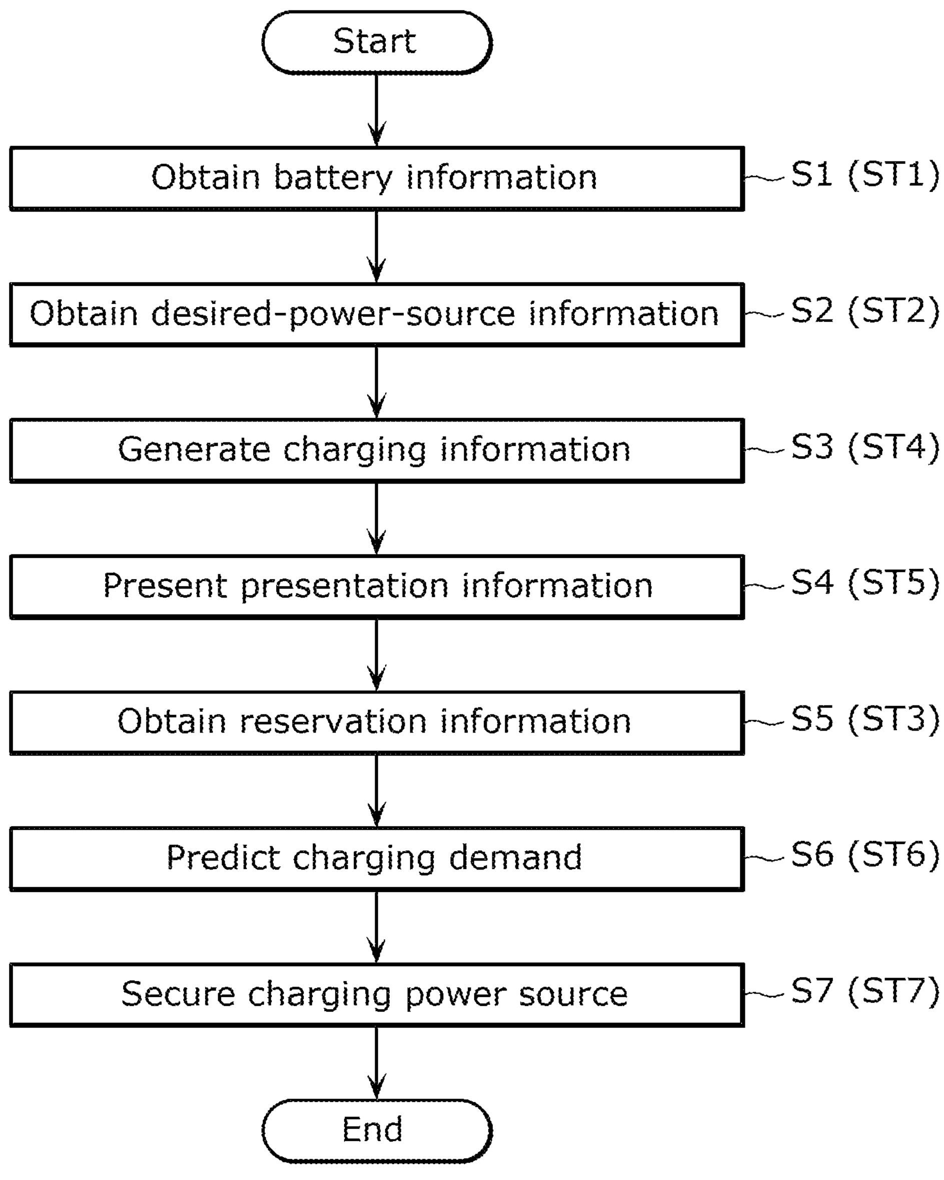
FIG. 7 is a flowchart illustrating an example of operation of the charging management system according to the embodiment.

An example of operation of charging management system 100 (the charging management method) according to the embodiment is described below with reference to FIG. 7. FIG. 7 is a flowchart illustrating an example of operation of charging management system 100 according to the embodiment.

First obtainer 11 periodically obtains battery information from electrified vehicle 2 (S1). Processing step S1 corresponds to first obtainment step ST1 in the charging management method. Processing step S1 is performed independently from other processing steps described below.

Second obtainer 12 obtains desired-power-source information from information terminal 5 (S2). Processing step S2 corresponds to second obtainment step ST2 in the charging management method. Specifically, when the user performs input regarding the desired-power-source information by operating information terminal 5, information terminal 5 transmits a signal including the desired-power-source information to second obtainer 12. By receiving the signal, second obtainer 12 obtains the desired-power-source information.

Charging information generator 14 generates charging information on the basis of the battery information obtained by first obtainer 11 and the desired-power-source information obtained by second obtainer 12 (S3). Processing step S3 corresponds to charging information generation step ST4 in the charging management method. Presentation unit 15 presents, to the user, the location information on the location of recommended charging facility 31 and the charging information generated by charging information generator 14 (S4). Processing step S4 corresponds to presentation step ST5 in the charging management method. Specifically, presentation unit 15 generates presentation information including the location information on the location of recommended charging facility 31 and the charging information. Then, presentation unit 15 transmits a signal including the generated presentation information to information terminal 5 via the communication network.

When the user operates information terminal 5 and a reservation for a charging session at recommended charging facility 31 is complete, third obtainer 13 receives a signal including reservation information from information terminal 5 and obtains the reservation information (S5). Processing step S5 corresponds to third obtainment step ST3 in the charging management method.

Predictor 16 predicts the charging demand at each charging facility 3 on the basis of the battery information on each electrified vehicle 2 obtained by first obtainer 11 and the desired-power-source information from each user obtained by second obtainer 12 (S6). Processing step S6 corresponds to prediction step ST6 in the charging management method. Processing step S6 is performed, for example, every time first obtainer 11 obtains the battery information or every time second obtainer 12 obtains the desired-power-source information. Processing step S6 is also performed, for example, every time third obtainer 13 obtains the reservation information.

Power source securing unit 17 secures one or more charging power sources 4 for each charging facility 3 on the basis of the charging demand at each charging facility 3 predicted by predictor 16 (S7). Processing step S7 corresponds to power source securing step ST7 in the charging management method. Processing step S7 is performed, for example, every time predictor 16 predicts the charging demand. The series of the processing steps is repeated.

4. Advantages

Advantages of charging management system 100 (the charging management method) according to the embodiment are described below. Recent years have seen an increasing need for electricity derived from renewable energy in consideration of the global environment and sustainability. However, the price of electricity derived from non-renewable energy such as fossil fuel energy is generally constant, whereas the price of electricity derived from renewable energy may vary depending on, for example, the time period and the weather. Thus, it is important to meet user's various needs including a need to use electricity derived from renewable energy by placing emphasis on environmental friendliness, a need to use electricity derived from non-renewable energy, such as fossil fuel energy, by placing emphasis on the cost, and a need to use both electricity derived from renewable energy and electricity derived from non-renewable energy.

With regard to this point, charging management system 100 (the charging management method) according to the embodiment can present, to the user, recommended charging facility 31 at which storage battery 21 can be charged using user's desired charging power source 4. In the embodiment, it is possible to facilitate charging storage battery 21 mounted on electrified vehicle 2 by using user's desired charging power source 4. In other words, in the embodiment, it is possible to meet user's various needs, such as a need to charge storage battery 21 by using charging power source 4 having composition in which emphasis is placed on the cost and a need to charge storage battery 21 by using charging power source 4 having composition in which emphasis is placed on the environmental friendliness.

Variation

Although charging management system 100 (the charging management method) according to the embodiment is described above, the present disclosure is not limited to the descriptions in the embodiment.

In the embodiment, second obtainer 12 (second obtainment step ST2) may obtain information indicating user's desired charging power source 4 whose type is more specifically specified by a user. For instance, second obtainer 12 may obtain not only the information indicating that the user wants to use first power source 41 as charging power source 4 but also the information indicating that the user wants to use, as charging power source 4, a power source that supplies power generated by solar power generation or a power source that supplies power generated by wind power generation.

In the embodiment, third obtainer 13 (third obtainment step ST3) may obtain not only reservation information on one charging session but also reservation information on two or more charging sessions. In this case, by operating information terminal 5, the user may reserve several charging sessions by, for example, specifying that storage battery 21 is charged at recommended charging facility 31 every several days.

In the embodiment, presentation unit 15 (presentation step ST5) may present one recommended charging facility 31 or two or more recommended charging facilities 31. In the latter case, the user may select, from recommended charging facilities 31, charging facility 3 that the user wants to use.

In the embodiment, predictor 16 (prediction step ST6) may predict the charging demand at each charging facility 3 without referring to the reservation information obtained by third obtainer 13 (in the third obtainment step ST3). In this case, charging management system 100 does not have to include third obtainer 13. In other words, the charging management method does not have to include third obtainment step ST3.

In the embodiment, charging management system 100 (the charging management method) may just present recommended charging facility 31 to the user and does not have to predict the charging demand at each charging facility 3 or secure charging power source 4 for each charging facility 3. For instance, a system other than charging management system 100 may predict the charging demand at each charging facility 3 and secure charging power source 4 for each charging facility 3. In this case, charging management system 100 does not have to include predictor 16 or power source securing unit 17. In other words, the charging management method does not have to include prediction step ST6 or power source securing step ST7.

In the embodiment, the desired-power-source information includes information regarding which one of first power source 41 derived from renewable energy and second power source 42 derived from non-renewable energy, such as fossil fuel energy, the user wants to use when charging storage battery 21. However, this is just an example. For instance, the desired-power-source information may include only the information indicating that the user wants to charge storage battery 21 by using one or more power sources among two or more types of power sources which are first power sources 41. In this case, for instance, the user wants to use, as charging power source 4, at least one of a power source that supplies power generated by solar power generation and a power source that supplies power generated by wind power generation. This means that second power source 42 does not have to be included in choices. Likewise, the desired-power-source information may include only the information indicating that the user wants to charge storage battery 21 by using one or more power sources from two or more types of power sources which are second power sources 42. In this case, for instance, the user wants to use, as charging power source 4, at least one of a power source that supplies power generated by thermal power generation and a power source that supplies power generated by nuclear power generation. This means that first power source 41 does not have to be included in choices.

In the embodiment, machine learning may be used for calculation of the charging demand by predictor 16. For instance, the machine learning is performed using, as input, various parameters, such as time periods, and the histories of past charging sessions. It should be noted that the charging demand changes as the time elapses. Thus, the machine learning may be performed in a state in which a newer parameter and newer data are given a higher priority.

The processing elements included in, for example, charging management system 100 according to the embodiment are typically embodied as LSIs, which are integrated circuits. The processing elements may be made as individual chips, or a part or all of the elements may be incorporated into one chip.

Circuit integration is achieved not only by an LSI but also by a dedicated circuit or a general-purpose processor. A field programmable gate array (FPGA) which can be programmed after manufacturing an LSI or a reconfigurable processor in which the connections and settings of circuit cells inside an LSI are reconfigurable may be used.

In the embodiment, each of the structural elements may be dedicated hardware or may be caused to function by executing a software program suitable for the structural element. The structural element may be caused to function by a program executer, such as a CPU or a processor, reading and executing a software program stored in a recording medium, such as a hard disk or semiconductor memory.

All the numbers used in the above descriptions are provided as examples to specifically explain the present disclosure. The present disclosure is not limited to the numbers provided as examples.

The configuration of the functional blocks illustrated in the block diagram is a mere example. Two or more functional blocks may be incorporated into one functional block. One functional block may be divided into more than one functional block. A part of the function may be transferred from one functional block to another functional block. The same hardware or software may process, in parallel or on a time-sharing basis, the functions of two or more functional blocks having similar functions.

The order in which the steps in the flowchart are performed is provided as an example to specifically explain the present disclosure. The steps may be performed in a different order. In addition, a part of the steps and another step may be performed simultaneously (in parallel).

For instance, in the embodiment, charging management system 100 is described as a single device. However, charging management system 100 may be embodied as two or more devices. When charging management system 100 is embodied as two or more devices, it does not matter how the structural elements of charging management system 100 are distributed among the two or more devices. The present disclosure may be achieved by cloud computing or edge computing.

Although the charging management system according to one or more aspects is described above, the present disclosure is not limited to the descriptions in the embodiment. The one or more aspects may include, within the scope of the present disclosure, one or more embodiments obtained by making various changes envisioned by those skilled in the art to the embodiment and one or more embodiments obtained by combining some of the structural elements described in different embodiments.

INDUSTRIAL APPLICABILITY

The present disclosure can be used in, for example, a system that manages charging of a storage battery mounted on an electrified vehicle.

The invention claimed is:

1. A charging management method comprising:

obtaining location information on a location of an electrified vehicle and battery information on a remaining capacity of a storage battery mounted on the electrified vehicle, the obtaining being first obtaining;

displaying a user interface for a user of the electrified vehicle to input a proportion of renewable energy and non-renewable energy used for charging the storage battery, displaying of the user interface being first displaying;

obtaining the proportion input into the user interface, the obtaining of the proportion being second obtaining;

determining a recommended charging facility recommendable for the user from among a plurality of charging facilities including first power sources derived from the renewable energy and second power sources derived from the non-renewable energy, based on the location information on the location of the electrified vehicle and the battery information obtained in the first obtaining and the proportion obtained in the second obtaining;

displaying, on a display, location information on a location of the recommended charging facility determined, the displaying of the location information on the location of the recommended charging facility determined being second displaying;

predicting a charging demand at each of the plurality of charging facilities, based on the battery information obtained in the first obtaining and the proportion obtained in the second obtaining; and securing the charging power source for each of the plurality of charging facilities, based on the charging demand predicted in the predicting.

2. The charging management method according to claim 1, further comprising:

obtaining reservation information as to whether a reservation for a charging session at the recommended charging facility displayed in the displaying has been made, the obtaining of the reservation information being third obtaining, wherein in the predicting, the charging demand is predicted based further on the reservation information obtained in the third obtaining.

3. The charging management method according to claim 1, wherein the displaying includes further displaying a cost of charging the storage battery.

4. The charging management method according to claim 1, wherein the first obtaining includes further obtaining route information on a scheduled driving route of the electrified vehicle, and, in the displaying, the location information on the location of the recommended charging facility is displayed based further on the route information obtained in the first obtaining.

5. A non-transitory computer-readable recording medium having recorded thereon a program for causing at least one processor to perform the charging management method according to claim 1.

6. A charging management system comprising:

a first obtainer that obtains location information on a location of an electrified vehicle and battery information on a remaining capacity of a storage battery mounted on the electrified vehicle;

a user interface display for a user of the electrified vehicle to input a proportion of renewable energy and non-renewable energy used for charging the storage battery;

a second obtainer that obtains the proportion input into the user interface;

a determiner that determines a recommended charging facility recommendable for the user from among a plurality of charging facilities including first power sources derived from the renewable energy and second power sources derived from the non-renewable energy, based on the location information on the location of the electrified vehicle and the battery information obtained by the first obtainer and the proportion obtained by the second obtainer;

a display that displays location information of the recommended charging facility determined by the determiner;

a predictor that predicts a charging demand at each of the plurality of charging facilities, based on the battery information obtained by the first obtainer and the proportion obtained by the second obtainer; and a securer that secures the charging power source for each of the plurality of charging facilities, based on the charging demand predicted by the predictor.

7. The charging management method according to claim 1, wherein the proportion indicates whether the user wants to use (i) a power source derived from renewable energy or (ii) a power source derived from non-renewable energy as the charging power source to charge the storage battery, when the proportion indicates that the user wants to use the power source derived from renewable energy as the charging power source to charge the storage battery, the recommended charging facility is selected from among the first power sources, and when the proportion indicates that the user wants to use the power source derived from non-renewable energy as the charging power source to charge the storage battery, the recommended charging facility is selected from among the second power sources.

8. The charging management method according to claim 1, wherein a unit price of the renewable energy differs from a unit price of the non-renewable energy, and the user interface displays a cost of charging the storage battery at the proportion input.

9. The charging management method according to claim 1, wherein as the proportion, the user interface receives, from the user, a first ratio of the renewable energy to energy required for a full charge and a second ratio of the non-renewable energy to the energy required for the full charge, and the user interface displays a total of the first ratio and the second ratio.

* * * * *